(12) United States Patent
Knight

(10) Patent No.: US 6,422,313 B1
(45) Date of Patent: Jul. 23, 2002

(54) APPARATUS AND METHOD FOR RECOVERING WASTE PRODUCTION GASES

(76) Inventor: Roy Knight, P.O. Box 1516, Norman, OK (US) 73070

(*) Notice: Subject to any disclaimer, the term of this patent is extended or adjusted under 35 U.S.C. 154(b) by 0 days.

(21) Appl. No.: 09/594,997

(22) Filed: Jun. 15, 2000

(51) Int. Cl.[7] ............................................. E21B 43/34
(52) U.S. Cl. ...................... 166/267; 166/68; 166/75.12; 166/369
(58) Field of Search ................................. 166/267, 266, 166/369, 75.12, 105.5, 105, 68

(56) References Cited

U.S. PATENT DOCUMENTS

| | | | | |
|---|---|---|---|---|
| 5,269,833 A | * | 12/1993 | Nitsche | .................... 95/93 |
| 5,441,365 A | * | 8/1995 | Duffney et al. | ............. 405/128 |
| 5,547,021 A | * | 8/1996 | Raden | .................... 166/250.07 |
| 6,164,935 A | * | 12/2000 | Turiansky | .................... 417/534 |

* cited by examiner

*Primary Examiner*—David Bagnell
*Assistant Examiner*—Zakiya Walker
(74) *Attorney, Agent, or Firm*—R. William Graham

(57) ABSTRACT

An apparatus and method for recovering waste production gas at an oil or gas production site using a gas-vacuum compressor, a gas-vacuum compressor cylinder or a regenerative vacuum blower to evacuate the waste production gas from the salt water tank and the oil tanks under vacuum and transporting the gas under pressure to a waste production gas recovery device without contaminating the atmosphere.

26 Claims, 4 Drawing Sheets

APPARATUS AND METHOD FOR RECOVERING WASTE PRODUCTION GASES

BACKGROUND OF THE INVENTION

The present invention relates generally to the recovery of waste gases, more specifically, the invention relates to an improved apparatus and method for the recovery of waste gases at an oil well site or at a gas well site during the production of oil or natural gas.

In the production of oil or natural gas there is a significant amount of by-product gases produced. Presently, these by-product gases are allowed to go directly into the atmosphere from a vent pipe or vent valve located on top of the oil storage tank(s), and/or on top of the salt water tank.

The production of oil or gas typically involves an oil or gas pool which requires a reservoir rock that is porous and permeable, and a trap to contain the oil or gas. The oil or gas travels from its source into and through the reservoir rock to the trap.

The trap usually is an impermeable rock which encloses above the reservoir rock. Due to buoyancy and time, the less dense oil or gas migrates to the top of the trap, displaces the saltwater, and remains in the trap. Thus, several layers form which include gas at the top, then in order, light oils, heavier oils, oil and salt water at the bottom.

Each well has its own inherent flow characteristics. The type of trap and geographical formation make up part of the natural flow characteristics of a pool of gas and oil. Common types of traps are dome, structural traps (created by relationships involving faults), and stratigraphic traps (resulting from variation in the layers, or strata).

Sedimentary rock usually forms reservoir rocks under certain conditions. Most reservoir rock consist of sandstone or limestone due to their permeable and porous characteristics. Generally, wells are drilled via a rotary bit method as is known in the art. When the drilling reaches the oil-bearing formations, the limits of the field are determined via formation samples taken during drilling and running well logs in the well casing pipe. Perforations in the casing are made at the oil and gas bearing formation zones. Production tubing is installed into the casing which is used to withdraw the oil and gas.

Initially, the rate of the flow and the pressure and volume of the well are controlled by special pipings and gate valves called a "Christmas tree" installed above ground. The recovery of oil and gas requires the use of separation equipment to separate the natural gas from the liquid petroleum and salt water.

On some wells, initial production is usually through the mechanism of primary recovery, wherein the oil and gas field's own pressure drives the oil or gas to the surface. Over time, the pressure in the field drops. Then, the oil must be pumped up to obtain production and difficulty resides in determining how long the pumping must be maintained for economic viability. A common drawback is that pumping the well causes removal of unwanted salt water from the well because it has a tendency to mix with the oil and gas as it enters the perforations casing as the reservoir decreases.

While some of the production gas is utilized in conventional methods, a great deal of gas is wasted and placed into the atmosphere. Accordingly, there exists a need to reduce waste production gases and to reduce hydrocarbon contamination of the atmosphere.

BRIEF SUMMARY OF THE INVENTION

It is an object of the present invention to recover waste production gases.

It is another object of the invention to prevent hydrocarbon contamination of the atmosphere.

It is still another object of the invention to reduce waste of natural resources.

In the past, production gases which contain entrapped hydrocarbons have been a waste by-product of gas/oil production operations. Accordingly, the present invention provides an improved method and apparatus for the recovery of such gases during the production of oil and natural gas.

In accordance with the present invention, the waste gas from the oil/gas production operations, which was previously vented into the atmosphere, is recovered in accordance with the present invention and sold to pipeline companies. An apparatus for recovering production gas waste at an oil or gas production site is provided and includes a gas-vacuum compressor, a power source for the gas-vacuum compressor, a vacuum piping connected to a first end of the gas-vacuum compressing means and to at least one of an oil tank, a salt water tank and a separator tank for enabling removal of gas therefrom. Further, included is production gas recovery device for recovering the removed gas and discharge piping connected to a second end of said gas-vacuum compressing means for enabling transporting the removed gas via the gas-vacuum compressor means to the production recovery device.

During the production of oil or gas at the oil or gas production site, the gas waste recovery apparatus (gas compressor) of the present invention removes the waste gas inside the oil and salt water tanks, compresses the gas and then transports it to either a gas/oil/salt water separator, a gas/liquid separator, or back to the gas well head and into the well. The recovered gas is eventually pumped to a gas pipeline, or a gas pressurized tank for future pickup.

DETAILED DESCRIPTION OF THE INVENTION

Waste production gaseous by-products present during the production operations at an oil/gas production site are generally released directly into the atmosphere through a vent pipe or vent valve located at the top of oil tanks(s) and/or the salt water tanks(s). This gaseous by-product which consists of natural gas as the major component along with various other hydrocarbon gases is not only harmful to the air we breath and detrimental to the ozone layer of the earth, but it also represents a marketable product. Therefore, the recovery of such gaseous product is not only beneficial to the environment but represents a significant economic value to the oil/gas producers. In accordance with the present invention, the waste production gas which is typically inside the oil and the salt water tanks, during the oil/gas production operation, is removed from the tanks, compressed and then recovered for subsequent use or sale.

Typically, the waste production gas is recovered during oil/gas production operation by a production gas recovery device which removes the waste gas inside the oil and salt water tanks, compresses it and transports it to one of the following: a gas/oil/saltwater separator, a gas/liquid separator, a gas well head, or a gas meter which meters the gas at the gas pipeline and/or a gas pressurized tank for future pickup. Use of the waste production gas recovery device of the present invention, at the oil/gas well site during the production operation allows the waste production gas to be recovered rather than vented into the atmosphere as is present practices. The gas recovery apparatus of the present invention comprises a gas compressor or a gas compressor cylinder or a regenerative vacuum/blower, including a power source, in combination with vacuum piping with appropriate fittings, discharge piping with appropriate fittings, various valves, one or more oxygen analyzer meters with appropriate gauges, and where automation systems are specified a computer operated system including support equipment.

Figure 1:
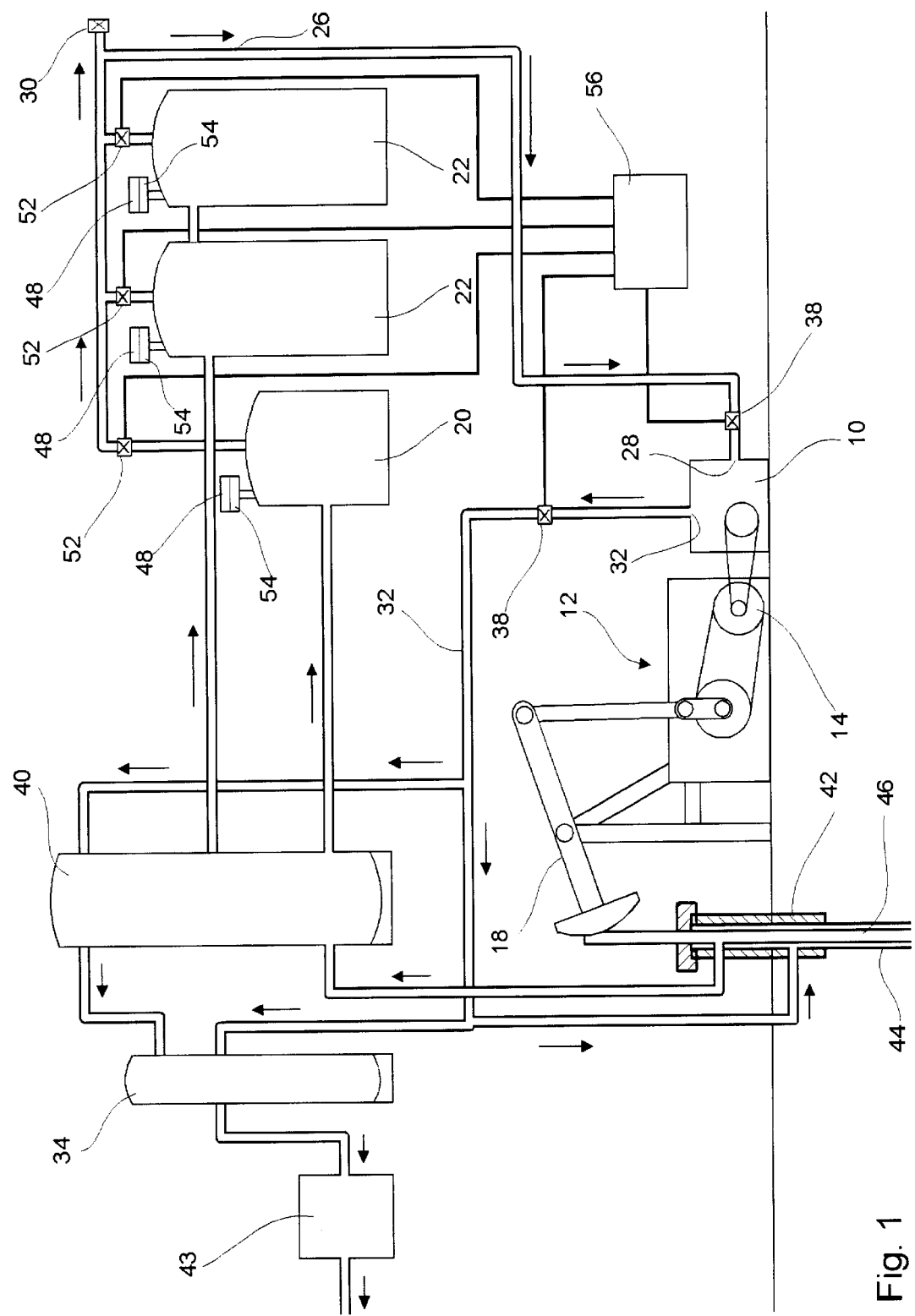
FIG. 1 is a schematic diagram illustrating one embodiment of the invention.

In one embodiment as shown in FIG. 1 of the drawings, the gas compressor 10 can be installed at the reciprocating rod lift pumping unit 12, commonly called "pump jack". The gas compressor 10 uses the same power source 14, typically an electric motor or a natural gas engine, that powers the pump-jack unit 12.

Figure 2:
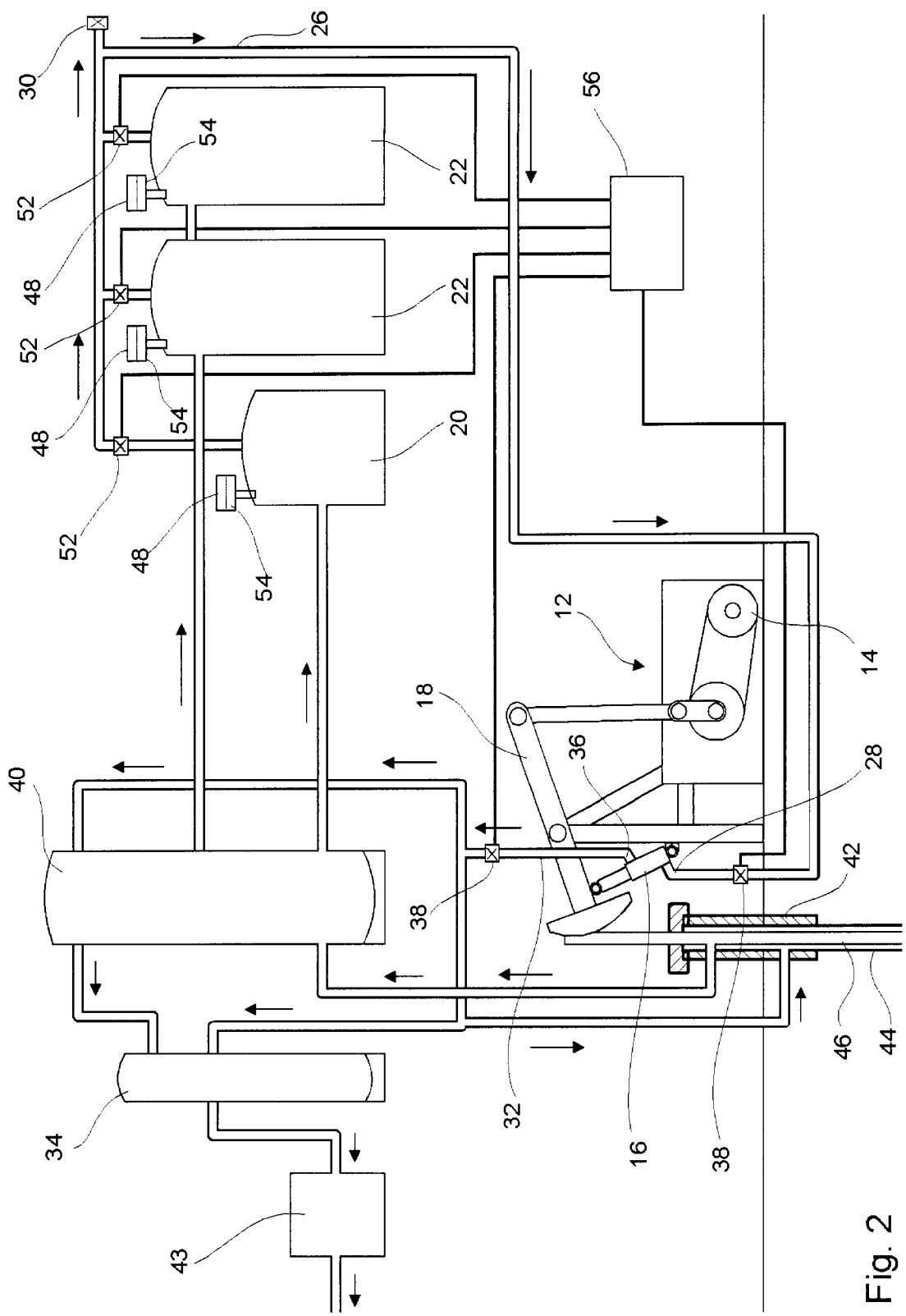
FIG. 2 is a schematic diagram illustrating another embodiment of the invention.

Alternately, the gas waste recovery apparatus comprises a gas compressor cylinder 16 installed on the waling beam 18 of the pump jack 12. The compressor cylinder 16 is illustrated in FIG. 2 as being installed on the front section of the walking beam 18 however, in an alternative aspect of the invention, the compressor cylinder 16 can be installed on the rear of the walking beam 18. The location of the compressor cylinder 16 is generally determined by the down hole weight and horsepower requirements of the recovery operation.

In one embodiment of the invention (FIG. 3), the gas compressor 10 (or the gas compressor cylinder 16) is operably installed at the salt water tank 20 and oil tank(s) 22, and together with the gas/oil/saltwater separator 40, are commonly called a "Lank battery." Preferably, the gas compressor 10 (or the gas compressor cylinder 16) is installed adjacent the last oil tank. For the purpose of the present invention, FIGS 1–4 illustrate two oil tanks although any number of oil tanks may be employed. The gas compressor 10 (or the gas compressor cylinder 16) can be powered by an electric motor or gas engine, or other power means (not shown). In still another embodiment of the invention, the gas compressor 10 (or gas compressor cylinder 16) is installed at a single fluids tank 24 which holds gas-containing oil and salt water under pressure.

The primary function of the gas compressor 10 or the gas compressor cylinder 16 is to remove the gas from both the salt water tank 20 and the oil tank(s) 22 (FIGS. 1–3) or from the single pressurized fluids tank 24 (FIG. 4) by applying a vacuum at the tops of the tails, compress the gas, and then pump the compressed gas to a gas/oil/salt water separator tank 40, to a gas/liquid separator tank 34, or to the well head 42 where it is returned under pressure to the well, or to all three locations, if desired. The production gas waste pumped to the gas/oil/salt water tank 40 and/or the gas liquid separator tank 34 is then transferred to a gas pipeline or a gas storage tank through a meter 43 where it is recovered.

Figure 3:
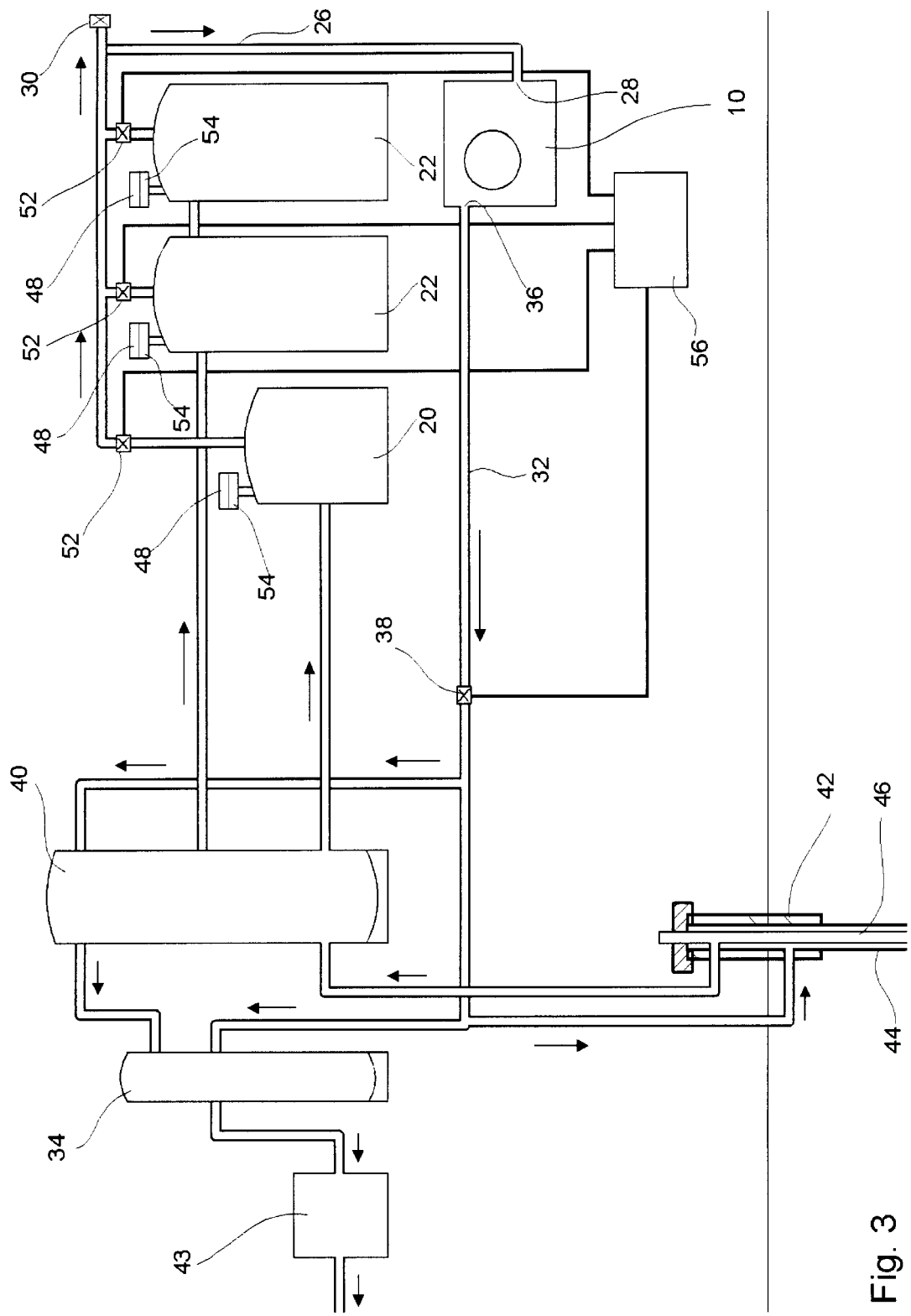
FIG. 3 is a schematic diagram illustrating yet another embodiment of the invention.
Figure 4:
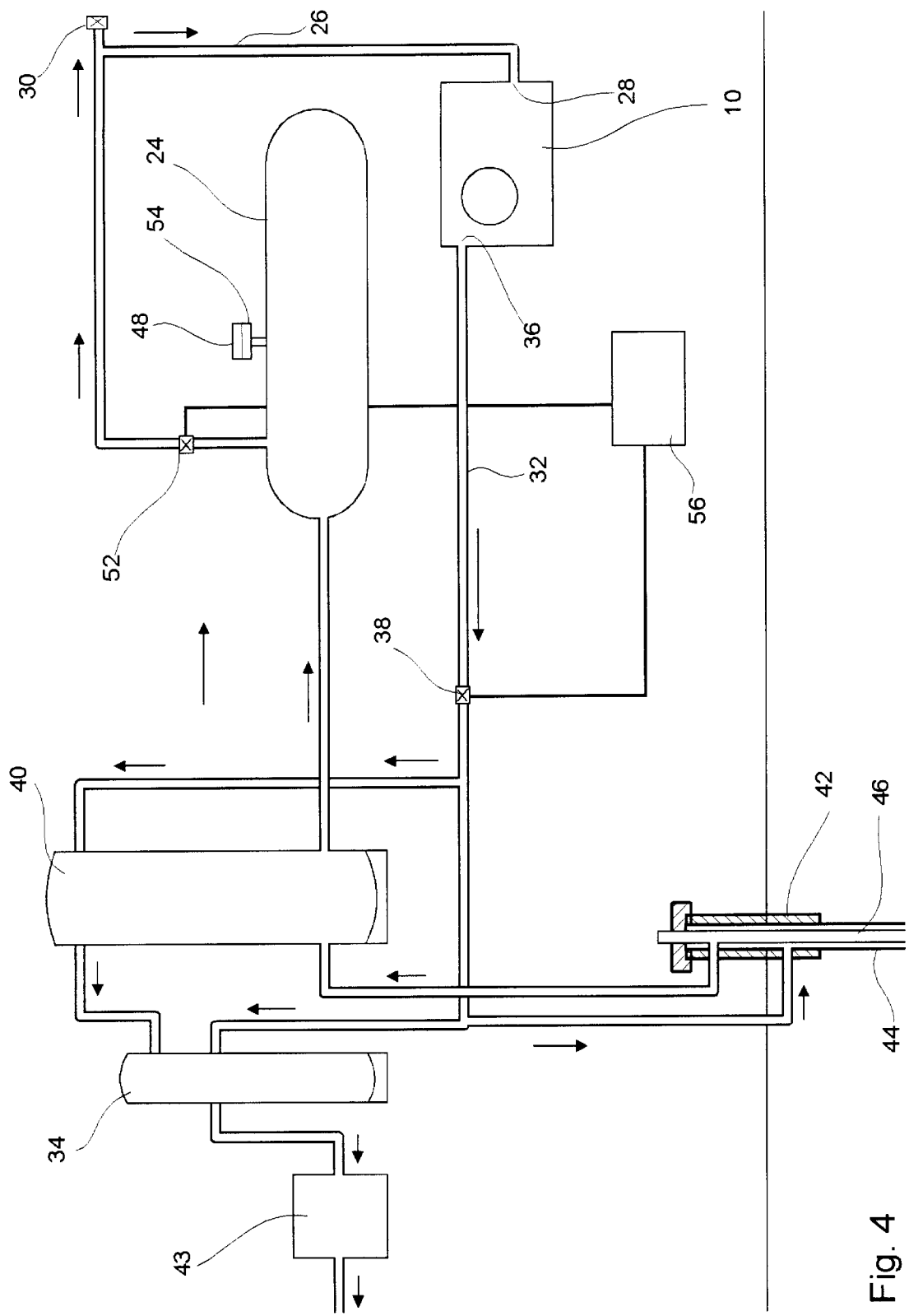
FIG. 4 is a schematic diagram illustrating still another embodiment of the invention.

According to the invention, vacuum pipe 26 connects all tanks, i.e., the salt water tank 20 and the oil tanks 22, together at their tops, as shown in FIGS. 1–3, or the single pressurized fluids tank 24 as shown in FIG. 4, to the vacuum inlet 28 of the gas compressor 10 or gas compressor cylinder 16. Typically, the vacuum line 26 extends past the last oil tank to a pressure release valve 30, then turns downward to the ground where it is buried across the production site. The vacuum pipe 26 is typically of a diameter to allow a sufficient quantity (cubic feet) of gas to be removed from the oil and salt water tanks during pumping operations. A standard 2-inch inner diameter pipe or smaller has been found to be sufficient to carry out the invention.

The pressure release valve 30 is connected to the vacuum piping 26 to allow gas pressure to escape into the atmosphere should the salt water tank 20 or the oil tanks 22 experience a higher pressure than the tank rating such as might happen if the gas compressor 10 or the gas compressor cylinder 16 should shut down or a leak occur somewhere in the system. In addition to the pressure release valve 30, one or more check valve may be connected along the vacuum piping 26 to provide additional safety against the gas compressor 10 or the gas compressor cylinder 16 from leaking air into the vacuum piping 26.

Discharge piping 32 having a sufficient inner diameter typically of two inches or less is connected to the gas compressor 10 or gas compressor cylinder 16 at the discharge outlet 36 opposite the vacuum piping 26. From the gas compressor 10 or gas compressor cylinder 16, the discharge piping 32 is connected to a gas/liquid separator 34, a gas/oil/salt water separator 40 and finally to a gas meter 43 which is connected to a pipeline or to a storage tank. The discharge piping 32 is also connected to the well casing piping 44. As with the vacuum piping 26, the discharge piping 32 is preferably buried across the production site. An automatic gas ignitor can be provided at the site to burn the production gas.

Gas-containing oil and salt water from the well is pumped or flows to a gas/oil/salt water separation tank 40 through production tubing 46 using the pump jack 12. The saltwater and oil components are pumped to the salt water tank 20 and to one or more oil tanks 22 as shown in FIGS. 1–3, or to an oil and salt water fluids tank 24 as shown in FIG. 4.

One or more check valves 38 are preferably installed along the discharge piping 32 for safety reasons as discussed above. A preset automatic pressure relief valve 48 may be added to those light wall tanks as an additional safety feature should the tank experience any abnormal pressure.

Several ball valves or gate valves 52 may be included, as needed, at various locations, e.g., above salt water tank, above oil tank, prior to a pressure relief valve, prior to vacuum side of the gas compressor or gas compressor cylinder, after discharge side of the gas compressor or gas compressor cylinder, prior to gas/oil/salt water separator, prior to gas/liquid separator, and/or prior to well head. The main reason for the numerous valves is that, in the event of a leak in one of the tanks or lines, it would be easier to find the leak by turning off the valves to each piece of equipment one-by-one until the leak is found. Solenoid valves could be used instead of some of the ball valves and activated by an automatic computer system to shut off the gas flow when pumping is stopped and/or turn on the gas flow when pumping is started again.

An oxygen analyzer meter 54 is installed at the salt water tank and at each oil tank to make sure that the system is free of oxygen at all times. Should oxygen get into the system the possibility of having an explosion increases.

The oxygen analyzer meter gauges 54 how much oxygen is in the system and shuts the system down if oxygen reaches a predetermined high level. Other gauges such as: vacuum gauges, pressure gauges and liquid level gauges may be installed at each tank. Temperature gauges at the gas compressor or gas compressor cylinder, and other gauges may be installed where needed.

A computer operated system 56 with support equipment can be attached to the gas compressor or the gas compressor cylinder, to the oil and salt water tanks, to vacuum and pressure pipelines, to solenoid valves, gauges, and the like to allow starting and stopping of the equipment as needed. With this said, computer operation is not critical since essentially gas only emanates from the well as the pump is operating thus moving the fluids/gas to the separator tank and thus the operation of the system can be triggered by the operation of the pump. Although the present invention has been described with reference to the drawings and to preferred embodiments, those skilled in the art will recognize that variations may be made without departing from the scope and spirit of the invention.

What is claimed is:

1. An apparatus for recovering waste production gas at an oil or gas production site comprising:
    a gas, oil and salt water separator tank for receiving gas, oil and salt water from an oil or gas production site and performing an initial separation of said gas from said oil and salt water, wherein said separated gas is transported to at least one of a sales line, a waste production gas tank and a return line to said oil or gas production site;
    at least one of an oil tank and a salt water tank, and an oil and salt water fluids tank for receiving the oil and salt water from said gas, oil and salt water separator tank;
    a gas-vacuum compressing means connected to said at least one of an oil tank, a salt water tank and an oil and salt water fluids tank for separating and removing residual waste production gas from said oil and salt water received from said gas, oil and salt water separator tank;
    a power source for said gas-vacuum compressing means;
    vacuum piping connected to a first end of said gas-vacuum compressing means and to said at least one of an oil tank, a salt water tank and a gas, oil and salt water fluids tank for receiving and transporting said residual waste production gas from said at least one of an oil tank, a salt water tank and a gas, oil and salt water fluids tank to said gas-vacuum compressing means; and
    discharge piping connected to a second end of said gas-vacuum compressing means for receiving and transporting said residual waste production gas from said gas-vacuum, compressing means to one of said gas, oil and salt water separator tank, wherein said residual waste production gas is transported to at least one of said sales line, said waste production gas tank and said return line.

2. The apparatus of claim 1 wherein said gas-vacuum compressing means includes at least one of a gas-vacuum compressor and a gas-vacuum compressor cylinder.

3. The apparatus of claim 1 wherein said gas-vacuum compressing means is a gas-vacuum compressor installed at a reciprocating rod lift pumping unit.

4. The apparatus of claim 3 wherein said gas-vacuum compressing means and said reciprocating rod lift pumping unit use the same power source.

5. The apparatus of claim 4 wherein said power source includes at least one of an electric motor, a gas motor and a natural gas engine.

6. The apparatus of claim 1 wherein said gas-vacuum compressing means is installed at a tank battery.

7. The apparatus of claim 6 wherein said tank battery comprises at least one of said oil tank and said salt water tank, and said oil and salt water fluids tank, said at least one of said oil tank and said salt water tank includes two tanks, one of which is a salt water tank containing salt water and residual waste production gas and one of which is an oil tank containing oil and residual waste production gas.

8. The apparatus of claim 7 wherein said tank battery further includes a gas, oil and salt water separator tank.

9. The apparatus of claim 1 wherein said gas-vacuum compressing means is a gas-vacuum compressor cylinder installed on a walking beam of a pump jack.

10. The apparatus of claim 1 wherein said vacuum piping is of a diameter large enough to allow sufficient quantity of gas to be removed from said tanks during pumping operation.

11. The apparatus of claim 1 wherein said discharge piping is of a diameter large enough to allow sufficient quantity of gas to be transported to at least one of said sales line, said waste production gas tank and said return line.

12. The apparatus of claim 1 further including at least one of an automated and mechanical pressure relief valve installed in said vacuum piping between said oil tank and said gas-vacuum compressing means.

13. The apparatus of claim 1 further including at least one check valve installed in said vacuum piping.

14. The apparatus of claim 1 further including at least one check valve installed in said discharge piping.

15. The apparatus of claim 1 further including at least one valve in at least one of said vacuum piping and said discharge piping.

16. The apparatus of claim 15 wherein at least a portion of said valve is activated by an automatic computer system.

17. The apparatus of claim 16 which includes means for sensing oxygen and triggering said activation of said at least one valve.

18. The apparatus of claim 1 further including at least one computer operated system.

19. The apparatus of claim 18 wherein said computer system is attached to at least one of the gas-vacuum compressing means, to the oil tanks, to the salt water tank, to the vacuum piping, to pressure piping, to solenoid valves, and to a plurality thereof.

20. The apparatus of claim 1 wherein said gas-vacuum compressor means is installed on a front section of said walking beam.

21. The apparatus of claim 1 wherein said gas-vacuum compressor means is installed on a back section of said walking beam.

22. A method for recovering waste production gas from an oil or gas production site comprising:
    performing an initial separation of waste production gas from oil and salt water in a gas, oil and salt water separation tank;
    transporting said separated waste production gas to at least one of a sales line, a waste production gas tank and a return line to the oil and gas production site;
    transporting said oil and salt water in said gas, oil and salt water separation tank to at least one of an oil tank and a salt water tank, respectively, and an oil and salt water fluids tank;
    removing residual waste production gas from said at least one of an oil tank and a salt water tank, and an oil and salt water fluids tank by vacuum;
    compressing said residual waste production gas from said at least one of an oil tank and a salt water tank, and an oil and salt water fluids tank; and
    transporting said compressed residual waste production gas from said at least one of an oil tank and a salt water tank, and an oil and salt water fluids tank to at least one of said sales line, said waste production gas storage tank and said return line.

23. The method of claim 22 wherein said residual waste production gas is removed from said salt water and from said oil by vacuum using vacuum piping connected to a first inlet side of a gas-vacuum compressing means.

24. The method of claim 23 wherein said residual waste production gas from said salt water and from said oil is compressed by said gas-vacuum compressing means.

25. The method of claim 24 wherein said compressed residual waste production gas is transported under pressure to said at least one of said sales line, said waste production gas storage tank and said return line using pressure piping connected to a second outlet side of said gas-vacuum compressing means.

26. An apparatus for recovering waste production gas at an oil or gas production site comprising:

a gas-vacuum compressing means installed at one of a reciprocating rod lift pumping unit, a tank battery and a walking beam of a pump jack;

a power source for said gas-vacuum compressing means;

production gas recovery means for recovering said removed gas;

vacuum piping connected to a first end of said gas-vacuum compressing means and to at least one of an oil tank, a salt water tank and a gas, oil and salt water fluids tank for enabling removal of gas therefrom; and discharge piping connected to a second end of said gas-vacuum compressing means for enabling transporting said removed gas via said gas-vacuum compressing means to said production recovery means.

* * * * *